UNITED STATES PATENT OFFICE.

RICHARD KOTHE, FRIEDRICH REINGRUBER, AND HUGO HASSENCAMP, OF ELBERFELD, GERMANY, ASSIGNORS TO THE FARBENFABRIKEN, VORMALS FR. BAYER & CO, OF SAME PLACE.

BLUE COLORING-MATTER.

SPECIFICATION forming part of Letters Patent No. 506,918, dated October 17, 1893.

Application filed May 26, 1893. Serial No. 475,631. (Specimens.) Patented in France November 29, 1892, No. 225,980; in Italy December 10, 1892, XXVII, 33,120, LXV, 98.

*To all whom it may concern:*

Be it known that we, RICHARD KOTHE, FRIEDRICH REINGRUBER, and HUGO HASSENCAMP, chemists and doctors of philosophy, subjects of the Emperor of Germany, residing at Elberfeld, Prussia, Germany, (assignors to the FARBENFABRIKEN, VORMALS FR. BAYER & CO., of Elberfeld,) have invented a new and useful Improvement in the Manufacture of Blue Coloring-Matter, (for which the aforesaid FARBENFABRIKEN, VORMALS FR. BAYER & CO., of Elberfeld, has already obtained Letters Patent in France, No. 225,980, dated November 29, 1892; in Italy, Vol. XXVII, No. 33,120, Vol. LXV, No. 98, dated December 10, 1892;) and we do hereby declare the following to be a full, clear, and exact description of our invention.

Our invention relates to the manufacture of blue triphenyl-methane dye-stuffs by condensing equimolecular proportions of tetramethyldiamidobenzhydrol (or tetraethyldiamidobenzhydrol) and alpha naphthylaminmono sulfo acid ($NH_2:SO_3H=1:2$), subsequently sulfonating the resulting product and finally oxidizing the thus obtained leuco compound.

In carrying out our invention we can proceed as follows: 2.3 parts, by weight, of alpha naphthylaminmono sulfo acid ($NH_2:SO_3H=1:2$) are mixed with 2.7 parts, by weight, of tetramethyldiamidobenzhydrol (or the corresponding quantity of tetraethyldiamidobenzhydrol.) About twenty parts, by weight, of water acidulated with 2.5 parts, by weight, of sulfuric acid (60° Baumé) are added to the above mixture. The resulting mixture is heated for a short time at about from 80° to 90° centigrade, till the tetramethyldiamidobenzhydrol employed is no longer distinguishable. After this time, the mass is poured into about ten parts, by weight, of water, adding a small excess of sodium carbonate. The sodium salt of the thus formed leuco mono sulfo product separates in bright white needles or scales, which dissolve in cold water with difficulty. Then, after filtering off, pressing and drying ten parts, by weight, of the above sodium salt having the formula:

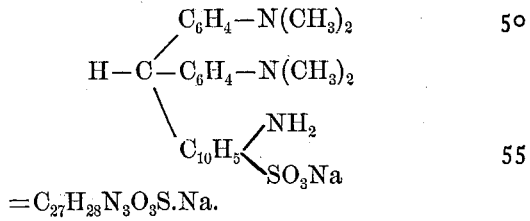

$=C_{27}H_{28}N_3O_3S.Na.$ are gradually stirred into forty parts, by weight, of fuming sulfuric acid (containing thirty per cent. of anhydrid). The sulfuric acid liquid is heated for about thirty-six hours at 30° centigrade. When the sulfonation is complete, the reaction mixture is poured on ice, and the sulfuric acid contained therein is neutralized with sodium carbonate, the new leuco disulfo acid, together with a part of the formed sodium sulfate, being separated in form of a cloudy mass. The latter is dissolved in hot water, and this watery solution is then neutralized with calcium carbonate or slacked lime. The solution containing the sodium salt of the leuco disulfo acid is filtered off from the precipitated calcium sulfate (gypsum).

The sodium salt of the formed leuco disulfo acid has the following composition:

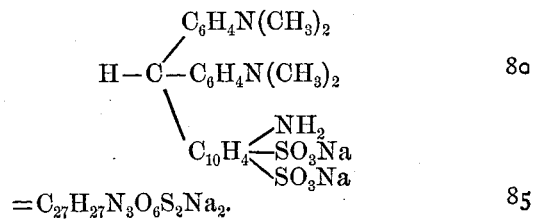

$=C_{27}H_{27}N_3O_6S_2Na_2.$

In order to oxidize the above leuco disulfo acid, a quantity of the watery solution of the aforesaid sodium salt which corresponds to ten parts, by weight, of the above leuco monosulfo acid, is mixed with such a quantity of water, that the whole quantity of water employed is one hundred parts, by weight, fifty parts, by weight, of a paste of lead dioxid (containing ten per cent. of lead dioxid) after well mixing with fifteen parts, by weight, of diluted acetic acid (containing fifty per cent. of pure acetic acid) are introduced on continuous stirring into the above solution of the sodium salt of the leuco disulfo acid. The formation of the dye-stuff is complete within a short time. After adding five parts, by weight, of sodium sulfate, the formed lead sulfate is filtered off. The resulting solution of the dye-stuff is evaporated to dryness and the thus obtained product is finely ground.

The dye-stuff forms a dark powder with bronze luster, easily soluble in water with a bluish-violet color, soluble in alcohol and pure acetic acid with a clear blue color. By concentrated sulfuric acid (66° Baumé) it is dissolved with a reddish-brown color turning into blue on the addition of a great access of ice-water. With concentrated hydrochloric acid (21° Baumé) a yellowish-brown solution is formed. On the addition of very strong soda-lye to its concentrated watery solution a violet precipitate is formed at first, which dissolves with a blue color on adding water, while the resulting liquid becomes almost colorless after standing for some time.

The dye-stuff produces clear blue shades on wool in an acidulated bath and also is suitable for printing purposes, as it yields clear blue shades fast to the action of alkalies and acids. The shades produced on wool and cotton do not change their hues in artificial light. An analogous result is obtained, if instead of condensing alpha naphthylamin sulfo acid ($NH_2SO_3H=1:2$) with tetramethyl (or ethyl) diamidobenzhydrol, sulphonating and finally oxidizing the so-formed leuco di-sulfo acid, alpha naphthylamintrisulfo acid ($NH_2:SO_3H:SO_3H:SO_3H=1:2:4:7$) or its alkaline salts are condensed with tetra methyl (or ethyl) diamidobenzhydrol and the resulting leuco compound is finally oxidized, as we have found, that in this process, (that is to say in condensing alpha naphthylamin tri-sulpho acid and tetra alkyldiamidobenzhydrol) a sulfo group is split off.

Having now described our invention and in what manner the same is to be performed, what we claim as new, and desire to secure by Letters Patent, is—

1. The process for the production of new triphenylmethane dye-stuffs by combining equimolecular proportions of tetramethyl (or ethyl) diamidobenzhydrol and alpha naphthylamin sulfo acid ($NH_2:SO_3H=1:2$), sulfonating the resulting leuco compound and oxidizing the thus obtained new leuco sulfo acid (or its salts) in the manner as hereinbefore described.

2. As a new article of manufacture the blue coloring-matter having probably the formula:

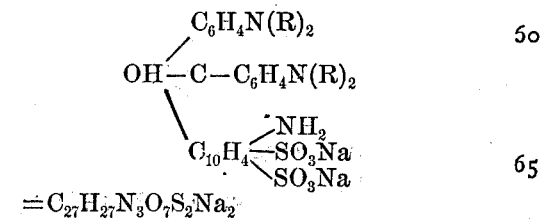

$$= C_{27}H_{27}N_3O_7S_2Na_2$$

(in which formula R signifies methyl or ethyl), forming a dark powder with bronze luster, easily soluble in water with bluish-violet color, in alcohol and pure acetic acid with a clear blue color, dissolving in concentrated sulfuric acid with a reddish-brown color, which turns into blue on the addition of a great excess of ice-water, being separated, on adding very strong soda-lye to its concentrated solution in water, in reddish-violet flakes, which dissolve again on adding water to this solution; producing when fixed on wool, or printed on cotton, clear blue shades fast against the action of alkalies and acids.

In testimony whereof we have signed our names in the presence of two subscribing witnesses.

RICHARD KOTHE.
FRIEDRICH REINGRUBER.
HUGO HASSENCAMP.

Witnesses:
WILLIAM ESSENWEIN,
RUDOLPH FRICKE.